United States Patent [19]

Gaston

[11] 4,103,628

[45] Aug. 1, 1978

[54] CONDITIONER DRILL

[76] Inventor: Charles O. Gaston, R.R. 2, Box 18, Cloverdale, Ind. 46120

[21] Appl. No.: 721,165

[22] Filed: Sep. 7, 1976

[51] Int. Cl.² ............................................. A01C 5/00
[52] U.S. Cl. .................................... 111/52; 172/142; 172/146; 172/177; 172/200
[58] Field of Search ........................................ 111/6–8, 111/14, 18, 19, 52, 53, 20, 83–85, 1; 172/142, 146, 147, 149, 151, 175, 177, 179, 184, 537, 554, 150, 200

[56] References Cited

U.S. PATENT DOCUMENTS

| 447,763 | 3/1891 | Coombs | 172/150 X |
|---|---|---|---|
| 1,250,570 | 12/1917 | Dunham | 172/537 X |
| 1,493,448 | 5/1924 | Krotz | 111/8 X |
| 1,522,074 | 1/1925 | Olson | 111/52 |
| 1,947,127 | 2/1934 | Dunham | 172/146 X |
| 2,035,591 | 3/1936 | Childs | 172/147 |
| 2,037,621 | 4/1936 | Dunham | 172/142 |
| 3,006,422 | 10/1961 | Mighell | 172/142 |
| 3,170,421 | 2/1965 | Norris et al. | 111/85 X |
| 3,225,839 | 12/1965 | Petitt | 172/142 X |
| 3,543,704 | 12/1970 | Hansen | 111/52 |
| 4,048,929 | 9/1977 | Zumbahlen | 111/70 X |

FOREIGN PATENT DOCUMENTS 246,174   10/1969   U.S.S.R. .................................. 172/175

OTHER PUBLICATIONS

Operator's Manual "OM-M16938M" John Deere "DR-A" Grain Drill, published for John Deere Company, 7/1959, p. 3.

Primary Examiner—Edgar S. Burr
Assistant Examiner—James R. Feyrer
Attorney, Agent, or Firm—Woodard, Weikart, Emhardt & Naughton

[57] ABSTRACT

A conditioner drill is disclosed herein which comprises two rows of plow teeth mounted at the front of a rectangular frame. Mounted on the frame behind the plow teeth are a drag plate and a compressor roller. A seed drill is mounted upon the frame behind the compressor roller and in front of a plain roller which is located at the rear of the frame. The conditioner drill includes a pair of wheels connected to the frame which may be lowered for transporting the conditioner drill. The conditioner drill may also include a farm chemical distribution system, such as a tank mounted upon the frame and connected to a boom sprayer located at the rear of the conditioner drill.

2 Claims, 7 Drawing Figures

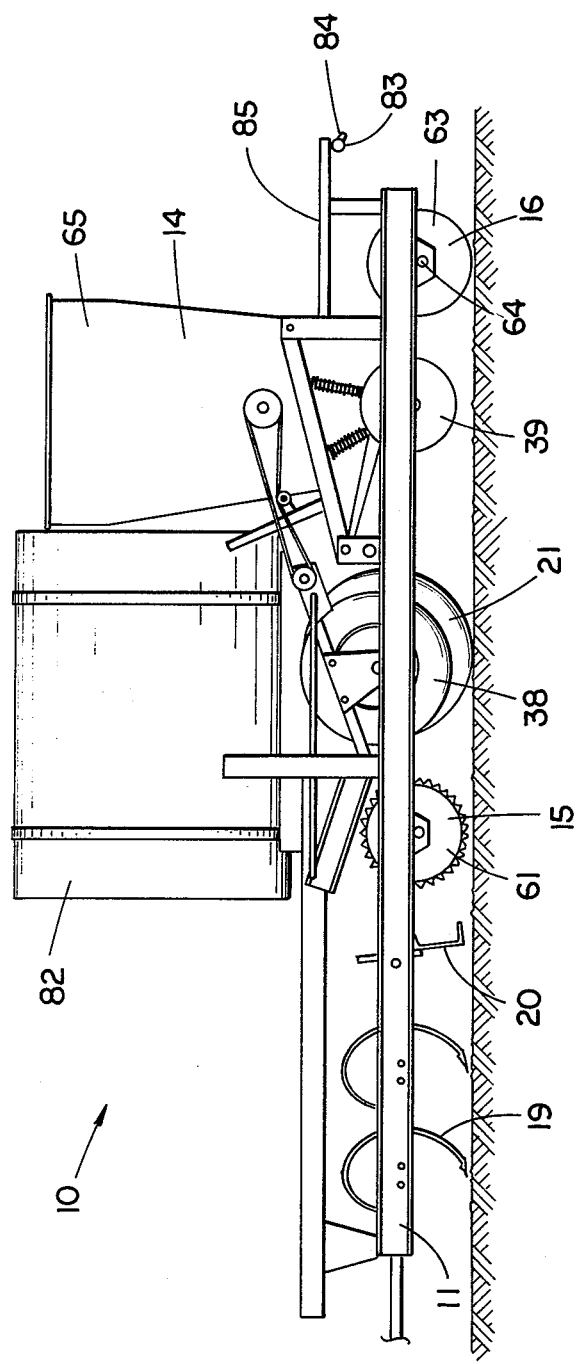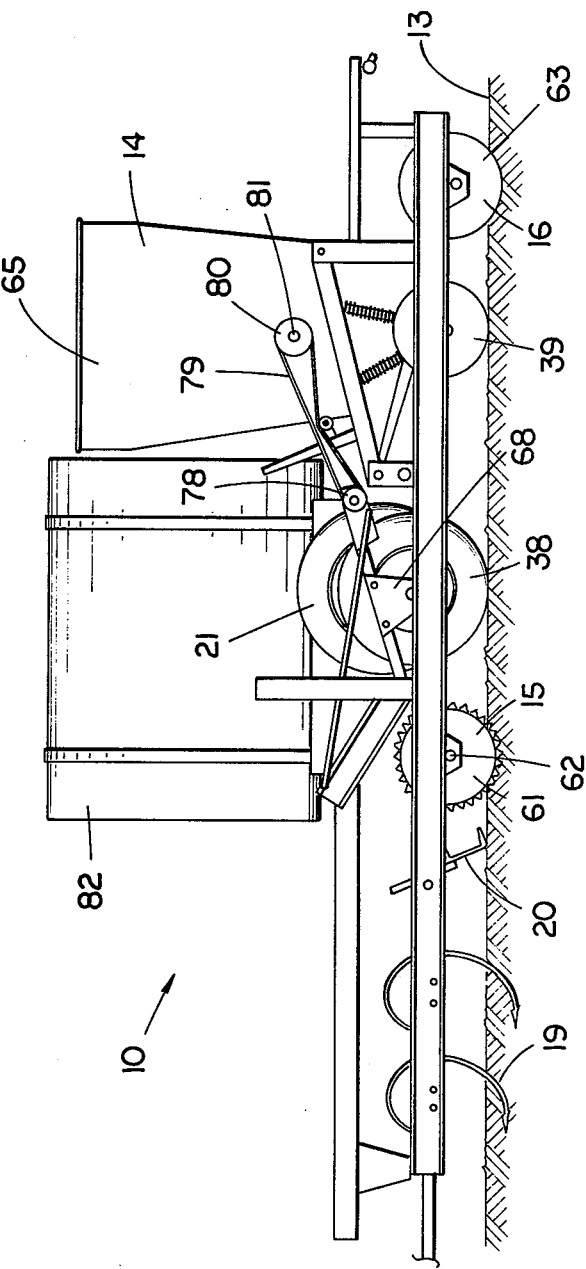

CONDITIONER DRILL

BACKGROUND OF THE INVENTION

1. Field of the Invention

This invention relates to the field of farm implements for conditioning the soil and planting seed therein, and more particularly to a farm implement which can perform these two operations with one pass over the ground which would be considered minimum tillage.

2. Description of the Prior Art

The individual components of the present invention are known in the prior art as being useful for performing particular farming operations. Plow teeth, drag plates, compressor roll devices, and planters have all been used individually, or in particular combinations, and each comes in a variety of forms. Heretofore, however, there has not been provided a single sweep farm implement which can satisfactorily perform the operations of conditioning and planting the soil.

One type of farm implement which is relevant to the present invention is commonly known as a mulcher. A mulcher consists of a frame in which is supported, in succession, a compressor roll, a field cultivator, a second compressor roll, an a wheat drill. The problem encountered in using a mulcher is that the support base provided by the two compressor rolls, which are located fairly close together, is relatively small. As a result, the wheat drill located at the end of the device does not operate to plant the seed at a uniform depth in the ground. Some of the seed is then located too close to the surface of the ground and may be blown away, eaten by birds or animals, or subjected to sufficiently adverse weather conditions as to fail to grow. On the other hand, some of the seed may be planted too deeply within the soil, and will be unable to force its way through the overlying ground to the surface, therefore failing to grow.

Applicant is also aware of a device marketed by Brillion Iron Works, Brillion, Wis. 54110 which includes a seeder for pasture grass. The seeder is located between two compressor rolls, but does not operate to simultaneously condition the ground and plant seed at a uniform depth within the ground.

SUMMARY OF THE INVENTION

This invention relates to a conditioner drill having a frame, means for moving the frame relative the ground, and including first and second compressor roll devices and a planter mounted upon the frame, the improvement comprising the planter being located on the frame between the first and second compressor roll devices, whereby seed deposited by the planter as the frame is moved relative the ground is located at a uniform depth in the ground.

It is an object of the present invention to provide a conditioner drill which simultaneously conditions the soil and plants seed at a uniform depth within the soil.

Another object of the present invention is to provide a conditioner drill which can condition and plant seed within the soil with a single sweep across the ground.

A further object of the present invention is to provide a conditioner drill which is compact and is easily constructed.

It is another object of the present invention to provide a conditioner drill which fulfills the above purposes, and which may also deposit a farm chemical upon the ground.

Other objects and advantages of the present invention will become apparent from the figures and description which follow.

BRIEF DESCRIPTION OF THE DRAWINGS

FIG. 2 is a side, elevational view of the conditioner drill of the present invention, showing the wheels in the second, down position.

FIG. 3 is a side, elevational view of the conditioner drill of the present invention, showing the wheels in the first, up position.

DESCRIPTION OF THE PREFERRED EMBODIMENT

Figure 1:
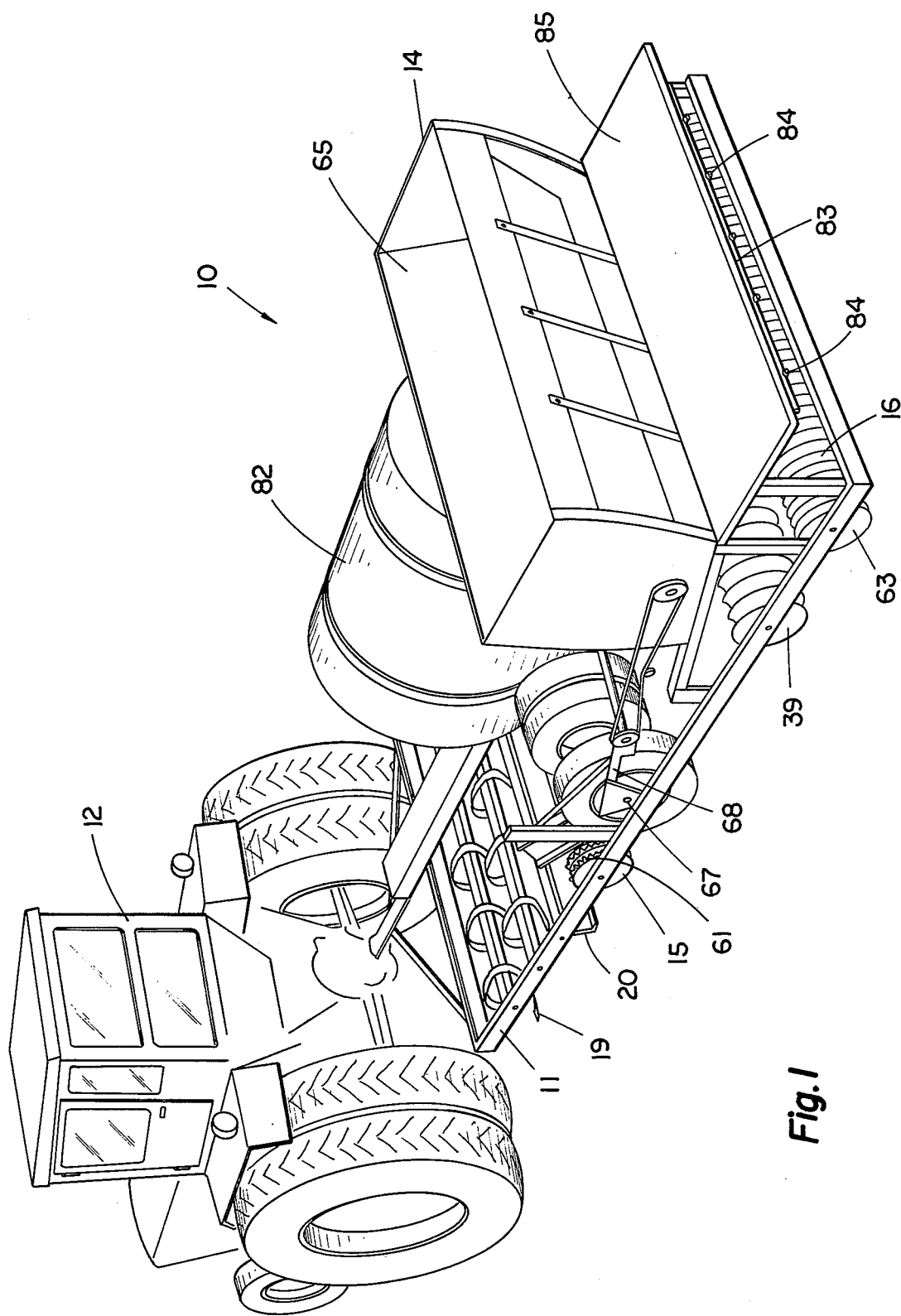
FIG. 1 is a perspective view of the conditioner drill of the present invention, shown attached to a tractor.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the Figures, there is shown an improved conditioner drill 10 according to the present invention. Conditioner drill 10 includes a frame 11 which may be attached to a tractor 12 (FIG. 1) or other suitable vehicle for moving the conditioner drill over the ground 13. Conditioner drill 10 includes a seed drill 14 or other suitable planter which is mounted upon frame 11 between compressor rolls 15 and 16. At the front of frame 11 there are mounted support members 17 and 18, to each of which are attached a plurality of plow teeth, such as 19. Plow teeth, such as 19, are preferably formed with a pointed spear head for engaging the ground. Mounted upon frame 11 behind support member 18, but in front of compressor roll 15, is a drag plate 20.

Figure 5:
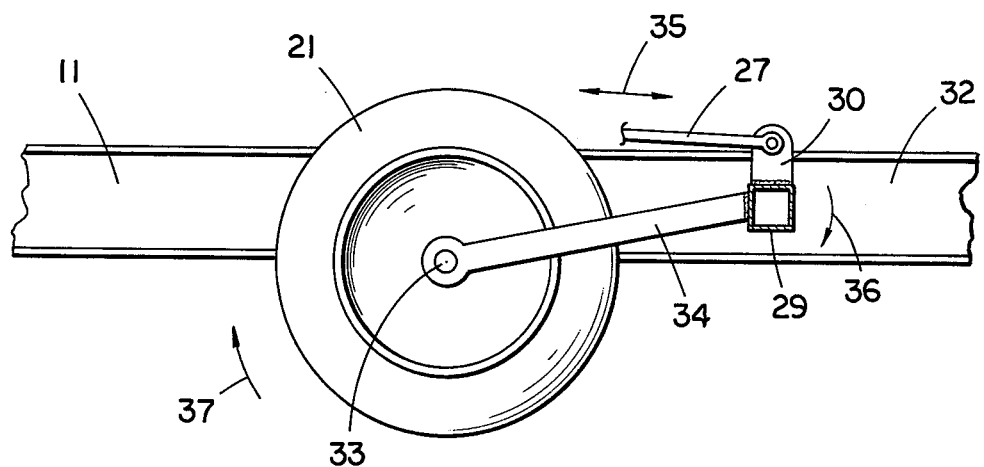
FIG. 5 is a partial, cross-sectional view of a portion of the conditioner drill of the present invention, showing in particular the operation of the wheels utilized to transport the conditioner drill.
Figure 6:
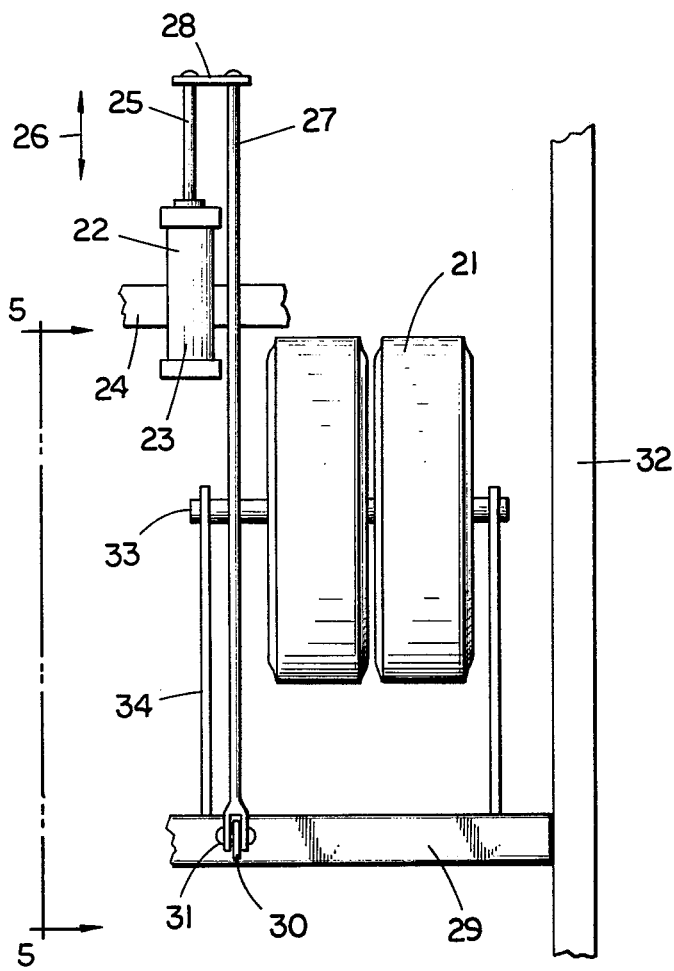
FIG. 6 is a top, plan view of a portion of the conditioner drill of the present invention, showing the mechanism for raising and lowering the wheels on which the conditioner drill is supported for transportation purposes.

Two pairs of wheels 21 are pivotally mounted to frame 11 generally at the center of the length of the frame 11 and near the two sides of frame 11. As is most clearly shown in FIGS. 5 and 6, a hydraulic system 22 is connected with wheels 21 to move them upwardly from or downwardly toward the ground 13. The hydraulic system 22 includes a hydraulic cylinder 23 attached to frame member 24 and operable to extend or retract piston rod 25 as shown by arrows 26. Rod 25 is connected by plate 28 to shaft 27. The opposite end of shaft 27 is connected to support beam 29 by rotatable connection with arm member 30. A hinge pin 31 is received within aligned apertures in shaft 27 and arm member 30 to provide hinged connection therebetween. Support beam 29 is rotatably mounted upon frame member 32. Wheels 21 are supported upon an axle 33 which is connected through arms, such as 34, to support beam 29. As a result of this interconnection, movement of piston rod 25 with respect to hydraulic cylinder 23 will produce a corresponding motion by shaft 27 as indicated by arrows 35. In particular, when shaft 27 is moved backwardly its full extent of travel, as shown in FIGS. 5 and 6, then support beam 29 is fully rotated in the direction of arrow 36, and wheels 21 are pivoted upwardly as indicated by arrow 37. Forward movement of shaft 27, accomplished by comparable forward movement of piston rod 25, causes support beam 29 to rotate in the direction opposite to arrow 36, and wheels 21 are thereby pivoted downwardly to engage the ground 13.

The two positions for wheels 21 are most clearly depicted in FIGS. 2 and 3. In FIG. 2, wheels 21 are shown in the fully down position, corresponding to maximum forward travel of shaft 27 relative to frame 11. In this position, the plow teeth, such as 19, drag plate 20, compressor rolls 15 and 16, drive wheel 38, and discs such as 39 of seed drill 14 are held above and away from the ground 13 over which conditioner drill 10 is moved. Conditioner drill 10 is thereby readily transported when wheels 21 are in the down position, as shown in FIG. 2. Wheels 21 are shown in the up position in FIG. 3, at which time conditioner drill 10 is supported by compressor rolls 15 and 16 and the discs, such as 39, of seed drill 14. Plow teeth such as 19 and drag plate 20 may then be positioned to engage the ground 13 over which the conditioner drill 10 is moved.

Figure 4:
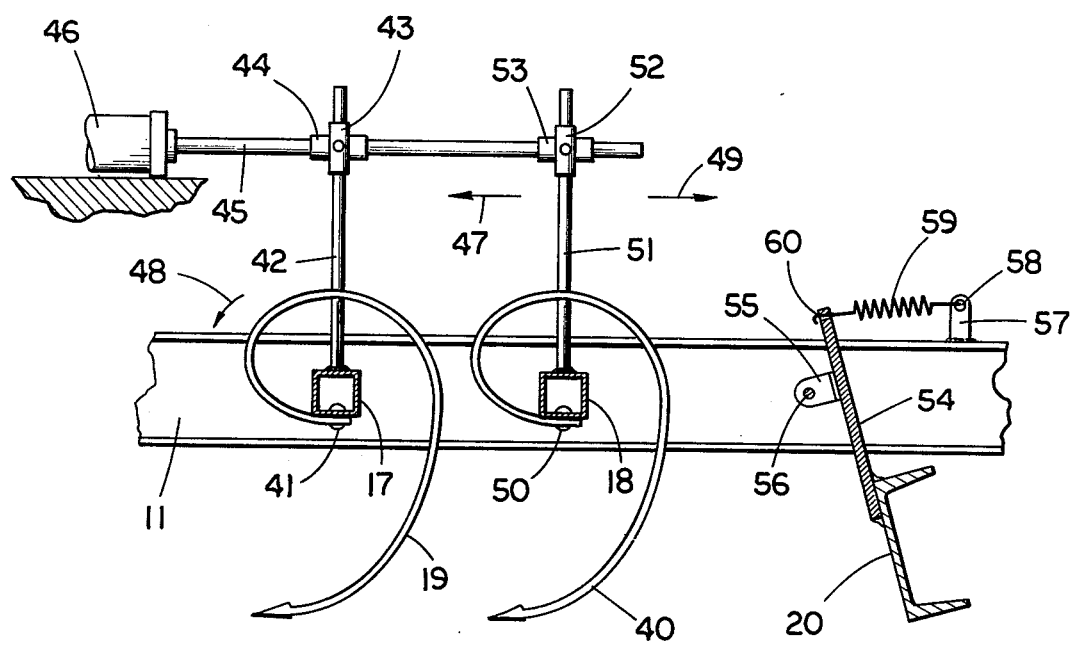
FIG. 4 is a partial, cross-sectional view of the front portion of the conditioner drill of the present invention, showing in particular the connections of the plow teeth and drag plate to the frame.

Referring now in particular to FIG. 4, there is shown a side, cross-sectional view of the front portion of conditioner drill 10. Two rows of plow teeth such as 19 and 40 span the width of frame 11 and are operable to engage the ground over which the frame is moved. A plurality of plow teeth such as 19 are attached to support member 17 by a bolt 41 or other suitable connecting means. Support member 17 is rotatably mounted upon frame 11 and includes a rod 42 which extends therefrom. Rod 42 is received within a sleeve 43 which is pivotally connected to a collar 44 secured to piston rod 45. Piston rod 45 is received within hydraulic cylinder 46 which is operable to extend or retract rod 45 relative thereto. Retraction of rod 45 in the direction of arrow 47 into cylinder 46 thereby results in rotation of support member 17 in the direction of arrow 48 relative to frame 11. Rotation of support member 17 results in a corresponding upward rotation of the plow teeth, such as 19, mounted thereon. The extension of piston rod 45 in the direction of arrow 49 results in an opposite rotation of support member 17 and plow teeth, such as 19, thereby positioning the plow teeth for engagement of the ground over which frame 11 is moved. Similarly, plow teeth such as 40 are secured, such as by a bolt 50 or similar connection means to support member 18. Support member 18 is connected to rod 45 through rod 51, which is received within sleeve 52. Sleeve 52 is pivotally connected to collar 53. Collar 53 is secured to rod 45 and operates to translate the linear movement of rod 45 to rotational movement of support member 18 relative frame 11.

Drag plate 20 is secured to support member 54 which is pivotally attached through bracket 55 to frame 11. A bolt 56 or similar connecting means is used to rotatably connect bracket 55 to frame 11. Arm 57 is secured to frame 11 and includes an aperture 58 in which one end of a tension spring 59 is received. The opposite end of tension spring 59 is received within aperture 60 defined by support member 54. The tension thereby provided between arm 57 and support member 54 produces a force which urges the bottom of drag plate 20 against the ground over which frame 11 is moved.

The plow teeth, such as 19 and 40, and drag plate 20 are attached in such a way as to be spring-biased against the ground over which the frame 11 of conditioner drill 10 is moved. The spring-biasing enables the plow teeth and drag plate to work the ground sufficiently, while permitting some give to exist to avoid structural damage when rocks or other objects in the ground are encountered. Spring-biasing is most conveniently obtained for the plow teeth such as 19 and 40 by forming the plow teeth from a metal which is sufficiently strong to move through the ground, but which is sufficiently flexible to give upon encountering rocks or other objects. The curved shape of the plow teeth is particularly desirable for performing this function since it provides a substantial length for the plow teeth over which resilient bending may occur when the teeth must move around or over objects which are in or on the ground. The spring-biasing means preferably employed in connection with the drag plate 20 has been previously described, and includes a tension spring 59 which urges support member 54 to pivot about bolt 56. Tension spring 59 urges drag plate 20 against the surface of the ground to level and smooth that surface, while permitting the drag plate to move over rocks or other objects which may lie at or near the surface.

Conditioner drill 10 preferably comprises a compressor roll 15 mounted upon frame 11 in front of seed drill 14, and a second compressor roll 16 mounted upon frame 11 behind seed drill 14. A compressor roll generally is a device utilized in farming to compact and/or break up the surface particles of the ground. In a most preferred embodiment of the present invention, compressor roll 15 includes several sprocketed discs, such as 61, which are rotatably mounted upon a shaft 62 which is attached to and extends the width of frame 11. This type of compressor roll is well known in the art, and functions to further break up the clumps of dirt which are loosened by the plow teeth such as 19 and 40. Also in a most preferred embodiment of the present invention, compressor roll 16 is a plain roller. A plain roller for the purposes of this description and the claims is defined as a compressor roll which does not include sprockets or similar elements intended to dig into the ground to any substantial extent. A plain roller is a compressor roll designed primarily to level out and compact the surface of the ground over which it is moved, and may comprise several discs or wheels, such as 63, rotatably mounted upon a shaft 64 attached to frame 11.

Seed drill 14 includes a hopper 65 and several pairs of discs, such as 39, which dispense the seed received from hopper 65. A variety of planters such as seed drill 14 are known in the art, and may be utilized with the present invention. The conditioner drill of the present invention, however, does provide certain particular advantages when a seed drill, as opposed to another type of planter, is employed. The discs which are utilized by a seed drill to dispense the seed will deposit the seed in a small furrow which normally will have a pair of ridges on either side of it. The various components of conditioner drill 10 which precede seed drill 14 properly prepare the ground for depositing the seed, and compressor roll 16 further smoothes and compacts the ground over the seed. The smoothing of the ground is important since the ridges otherwise present would erode and cause an excessive amount of dirt to cover and harden in place over the seed, thereby inhibiting the growth of the plants.

Another general advantage of conditioner drill 10 is the broad base provided by the spaced apart compressor rolls 15 and 16. Prior art devices which locate the planter behind two compressor rolls have a small wheel base which leads to uneven depth distribution of the seed by the planter. Conditioner drill 10 places the planter, such as seed drill 14, between and spaced apart from compressor rolls 15 and 16, thereby providing a more uniform depth for the deposited seeds. The most advantageous position and spacing of the planter relative the compressor rolls 15 and 16 may be readily determined for the particular planter and compressor rolls used by experimentation.

It should be noted that due to the nature of the farm industry, it may be desirable to construct the conditioner drill without the planter, and allow the individual owner to incorporate the particular planter which he has at the present time. Since many farmers will already have a planting device, and since the present invention is useful in conjunction with a variety of planters, it is both possible and desirable to permit the individual to incorporate his own planter onto the frame work which would include the other components of conditioner drill 10.

Figure 7:
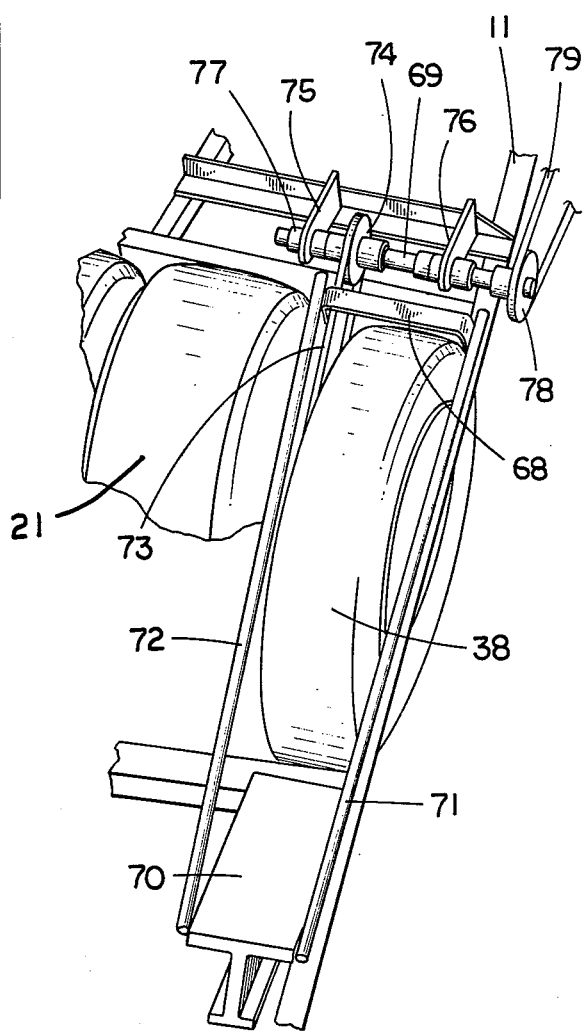
FIG. 7 is a partial, perspective view of the drive wheel utilized in accordance with the present invention to drive the seed drill.

Connected to seed drill 14 is a drive wheel 38 which is operable to engage the ground over which frame 11 is moved. As shown in FIG. 3, drive wheel 38 engages the ground 13 when wheels 21 are in the up position. Axle 67 (FIG. 1), upon which drive wheel 38 is mounted, is secured to brace member 68, which is hingedly attached at its rearward end to rod 69. Rod 69 is in turn secured to frame 11. Drive wheel 38 may therefore pivot about rod 69 in order to follow the contour of the ground over which conditioner drill 10 is moved. Beam 70 is secured to drive wheel 38 through support arms 71 and 72 (FIG. 7). The weight of beam 70 insures that drive wheel 38 will follow the contour of the ground, and will also firmly engage the ground so that movement of conditioner drill 10 will result in rotation of drive wheel 38 rather than the drive wheel slipping. The rotation of drive wheel 38 is transmitted through belt or chain 73 (FIG. 7) to pulley or sprocket 74, which is secured to rod 69. Rod 69 is rotatably held within frame members 75 and 76 by retainer rings such as 77. Rotation of rod 69 is then transmitted through pulley or sprocket 78 and belt or chain 79 to pulley or sprocket 80. Pulley 80 is secured to shaft 81 which drives seed drill 14, thereby causing the seed to be deposited by seed drill 14 at a rate proportional to the rotation of drive wheel 38, and therefore proportional to the speed of conditioner drill 10 across the ground 13.

Conditioner drill 10 may further comprise any of a variety of farm chemical distribution systems. The various farm chemicals which may be desired to be distributed by conditioner drill 10 would include the various fertilizers, insecticides, herbicides, weed killers and related materials which are employed in farming operations to assist the growth of the crops. For example, conditioner drill 10 may include a tank 82 containing the desired chemical and mounted upon frame 11. Tank 82 is then connected to boom 83 which includes several nozzles 84 for dispensing the chemical onto the ground behind conditioner drill 10. Another feature of conditioner drill 10 is the provision of a platform 85 from which hopper 65 of seed drill 14 and tank 82 may be conveniently filled.

The conditioner drill of the present invention, as described above, provides a farm implement which will simultaneously condition the soil and plant seeds within the soil at a uniform depth. The components of the conditioner drill are positioned so that movement of frame 11 over the ground will result in the ground being properly conditioned for planting, and will result in the seed being properly positioned within the ground.

The first components of the conditioner drill of the present invention to encounter the ground are the several plow teeth, such as 19 and 40, positioned in rows across the front of frame 11. The plow teeth are preferably spear headed to promote entry of the plow teeth into the ground. The plow teeth are also preferably spring-biased to have sufficient strength to act against the ground, but also to have the ability to move over or around objects such as rocks which may be within the ground. The plow teeth are advantageously connected to a hydraulic system, as described, to permit the teeth to be lowered into or raised from the ground as desired. Attached to frame 11 behind the several plow teeth is a drag plate 20. Drag plate 20 is preferably spring-biased to engage the surface of the ground over which the frame is moved. The effect of the plow teeth is to turn over the ground, and usually results in large clumps of dirt being moved to a position at or above the normal surface of the ground. The drag plate 20 operates to level and break up these clumps of dirt.

Behind the drag plate on the frame and positioned to next encounter the ground is a compressor roll device, which is preferably a sprocketed roller. The presence of the sprockets is advantageous in that the sprockets act to further break up the clumps of dirt at the surface of the ground. The roller also acts to smooth and compact the ground in preparation for planting. A planter, and preferably a seed drill, is located on frame 11 behind the first compressor roll 15, and deposits the seed within the ground. Location of seed drill 14 between compressor rolls 15 and 16 provides a sufficient support base for conditioner drill 10 to insure that the seed will be deposited at a uniform depth within the ground. The second compressor roll 16, which is preferably a plain roller, follows the planter over the ground and acts to further level and compact the dirt over the planted seed.

With one sweep of the conditioner drill of the present invention across the ground, the seed is planted at a proper, uniform depth within dirt which has been worked by components of the conditioner drill 10 to have the proper consistency for the seed. With prior art devices, it has generally been necessary to make more than one sweep across the ground, the first being to condition the earth and the second being to plant the seed. Problems have also previously been encountered because of improper location of the seed within the ground, and insufficient conditioning of the soil. An example of this has been encountered with seed drills when the seed is implanted in a furrow formed by the paired discs of the seed drill. A ridge of dirt generally extends along either side of this furrow and wind or rain may cause the dirt in the ridges to build up over the furrow. As a result, more dirt than desired is located above the seed. This dirt may build up to a sufficient extent, or may compact or harden to a sufficient extent, as to prohibit or severely inhibit the growth of the seed. The conditioner drill 10 of the present invention provides a farm implement which overcomes problems such as this and results in improved and more uniform growth of the deposited seed.

While there have been described above the principles of this invention in connection with specific apparatus, it is to be clearly understood that this description is made only by way of example and not as a limitation in the scope of the invention.

What is claimed is:

1. In a conditioner drill having a frame and means for moving the frame relative the ground, and including first and second compressor roll devices and a planter mounted upon the frame, the frame having a front half portion and a back half portion, the first compressor roll device being mounted upon the frame in front of the planter, the improvement comprising:

a first plurality of plow teeth mounted upon the frame in front of the first compressor roll device; and the planter being located on the frame between the first and second compressor roll devices, and having means whereby seed deposited by the planter as the frame is moved relative the ground is located at a uniform depth in the ground, said means including said first compressor roll device located in said front half portion whereas said second compressor roll device and said seed drill are located in the back end of said back half portion, said first and second compressor roll devices cooperatively supporting said frame above ground;

said planter located on said frame having a plurality of ground engaging extensions to form furrows into which seed is planted;

drive means mounted on said frame between said first compressor roll device and said planter and including a drive wheel pivotally mounted upon said frame and positioned to engage ground over which the frame is moved and being connected to said planter to cause the planter to deposit seed into the ground at an even rate per unit area regardless of the speed of said frame over the ground, said drive means including means connected to said drive wheel operable to force said drive wheel to extend at an elevation different than said compressor roll devices to continuously contact ground in the event a ground ridge is present between the compressor roll devices and beneath said drive wheel.

2. The improvement of claim 1 and further comprising:

a first support member rotatably mounted on said frame at the most forward position on said frame front half portion, said first plurality of plow teeth attached to said support member;

first control means operable to urge said support member to rotate relative to said frame to cause said teeth to engage the ground;

a second support member rotatably mounted on said frame between said first support member and said first compressor roll device;

a second plurality of plow teeth attached to said second support member and wherein said second support member being connected to said first control means operable to urge said second support member to rotate relative to said frame to cause said second plurality of plow teeth to engage ground;

a drag plate movably mounted on said frame between said second support member and said first compressor roll device;

spring means connected to said drag plate and operable to urge said drag plate against the ground but yieldable to allow said drag plate to move away from said ground when contacting an immovable object;

a pair of wheels pivotally mounted upon the frame, said wheels having a frst position in which the first and second compressor roll devices rest upon the ground, and a second position in which the conditioner drill is supported upon the ground by said wheels, whereby the conditioner drill may be readily transported;

control cylinder means mounted upon said frame and operably connected to said pair of wheels being operable to raise and lower said pair of wheels relative to said frame, said pair of wheels being located between said first compressor roll device and said planter; and, liquid spray means mounted to said frame aft of said second compressor roll device being operable to spray a liquid upon ground.

* * * * *